United States Patent [19]

Yamamoto et al.

[11] Patent Number: 5,754,868
[45] Date of Patent: May 19, 1998

[54] ELECTRONIC APPARATUS HAVING CONVENTIONAL AND BATTERY POWER SOURCES, AND HAVING A BATTERY DISCHARGE MODE WHEREIN A FIRST PORTION OF THE APPARATUS IS POWERED BY THE CONVENTIONAL POWER SOURCE AND A SECOND PORTION OF THE APPARATUS IS POWERED BY THE BATTERY

[75] Inventors: Hiroyuki Yamamoto, Yamato; Tatso Kawamura, Yokohama, both of Japan

[73] Assignee: International Business Machines Corp., Armonk, N.Y.

[21] Appl. No.: 537,038

[22] Filed: Sep. 29, 1995

[30] Foreign Application Priority Data

Sep. 28, 1994 [JP] Japan .................. 6-233285

[51] Int. Cl.$^6$ .................. G06F 1/26; G06F 1/30
[52] U.S. Cl. .................. 395/750.01; 395/182.12; 364/492; 307/66
[58] Field of Search .................. 395/750, 750.01, 395/182.12; 364/492; 307/66, 48; 320/2, 5; 361/92, 115

[56] References Cited

U.S. PATENT DOCUMENTS

| | | | |
|---|---|---|---|
| 4,611,289 | 9/1986 | Coppola | 364/492 |
| 4,841,160 | 6/1989 | Yon et al. | 307/66 |
| 5,148,042 | 9/1992 | Nakazoe | 307/60 |
| 5,151,907 | 9/1992 | Robbins | 395/182.2 |
| 5,247,205 | 9/1993 | Mototani et al. | 307/66 |
| 5,270,946 | 12/1993 | Shibasaki et al. | 364/492 |
| 5,410,713 | 4/1995 | White et al. | 395/750 |
| 5,448,152 | 9/1995 | Albright | 320/15 |
| 5,579,197 | 11/1996 | Mengelt et al. | 361/93 |

*Primary Examiner*—Gopal C. Ray
*Attorney, Agent, or Firm*—Martin J. McKinley

[57] ABSTRACT

A data processing system that employs a rechargeable battery and supports a full discharge of the battery and that is not shut down even if a user mistakenly removes a battery while the system is being operated in a full discharge mode, and a power supply apparatus for such a data processing system and a method for using the apparatus. When a data processing system is to be operated in a full discharge mode, an external power source constantly and steadily supplies power to the first electric circuitry, while a battery supplies power to the second electric circuitry until the discharge is completed. The first electric circuitry is designed to include components, such as a CPU and a main memory, that may force the entire system to be shut down when the supply of power is abruptly halted to those components. The second electric circuitry is designed to include components, such as a backlight of a liquid crystal display device, that do never cause the entire system to be shut down even when the power supply to only these components is abruptly terminated. Therefore, when a user mistakenly removes a battery while a full discharge of the battery is in progress, only the power supply to the second electric circuitry is stopped, and the whole system will not be shut down. When the power supply arrangement is so designed that only an external power source supplies power in response to the detection of the removal of the battery, only a backlight is turned off at the moment a battery is removed; and immediately turned on so that the task executed by the CPU 11 will not be abruptly terminated.

8 Claims, 4 Drawing Sheets

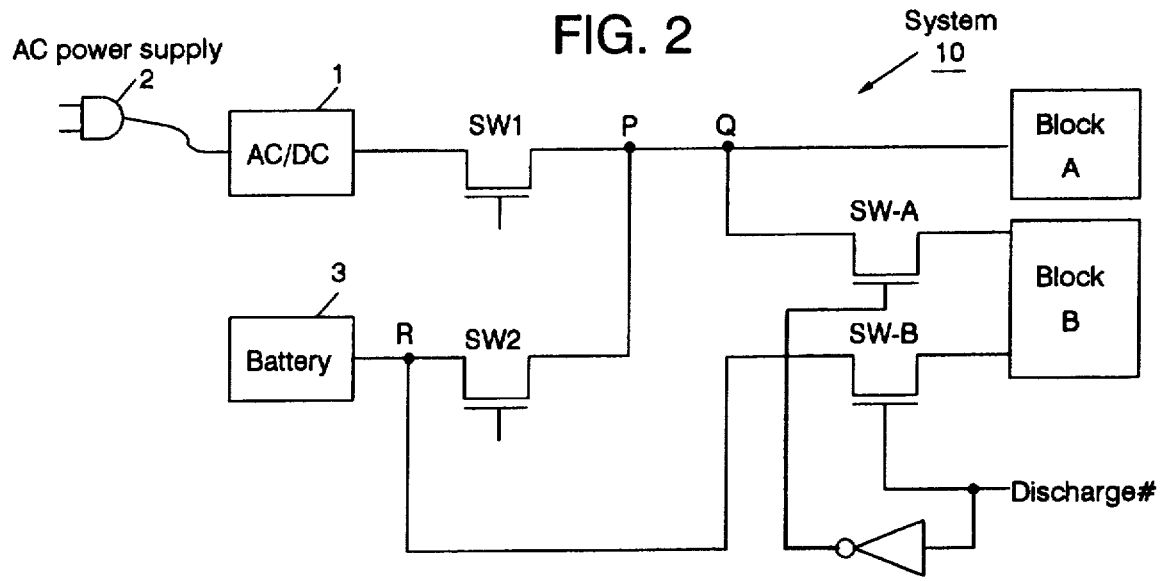
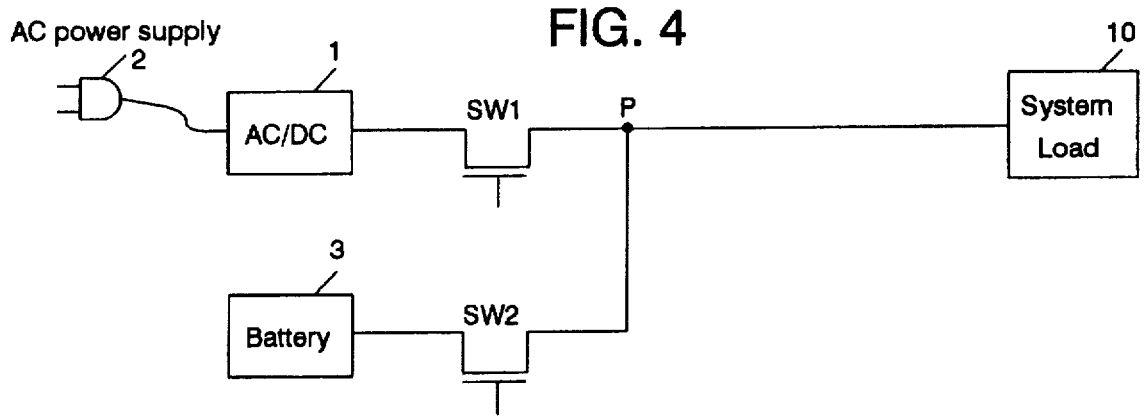
| | SW-A | SW-B | SW2 |
|---|---|---|---|
| Driving by AC power supply | ON | OFF | ON |
| Full discharging | OFF | ON | OFF |

5,754,868

ELECTRONIC APPARATUS HAVING CONVENTIONAL AND BATTERY POWER SOURCES, AND HAVING A BATTERY DISCHARGE MODE WHEREIN A FIRST PORTION OF THE APPARATUS IS POWERED BY THE CONVENTIONAL POWER SOURCE AND A SECOND PORTION OF THE APPARATUS IS POWERED BY THE BATTERY

Applicants claim the foreign priority benefits under 35 U.S.C. 119 of Japanese Application No. 6-233285 filed Sep. 28, 1994. This Japanese Application and its translation are incorporated by reference into this Application.

The present invention relates to a data processing system that is activated by a battery and a power supply apparatus, and a method for supplying power to such a data processing system. In particular, the present invention pertains to a data processing system, which is connected to power lines from an external AC power source and an internally mounted battery that are arranged in parallel and which is activated by power supplied from either power source, and a power supply apparatus and a method for using the apparatus to power a data processing system. In further detail, the present invention relates to a data processing system, which has an internally mounted rechargeable battery, and which supports a full discharge function and does not shut down even if a user mistakenly removes a battery while operating in a full discharge mode, and a power supply apparatus and a method for using the apparatus to power a data processing system.

As the technique has been advanced, personal computers that are designed to be compact and light in consideration of portability and outdoor use, i.e., a so-called "notebook computer," has been widely used. Almost all the notebook computers that are currently available on the market can be activated not only by an external AC power source (generally, a commercially available power source) but also by a packaged, internally mounted battery (hereafter referred to as a "battery pack") where there is no commercially available power source. A rechargeable battery, such as a NiCd, a NiMH, or a LiIon, is normally used as an internally mounted battery for a notebook computer. As a popular charging form for an internally mounted battery, it receives power from an AC power source, which is connected to a system in parallel with the battery pack (this will be described later).

FIG. 4 illustrates an example, conventional power supply channel for a notebook computer 10 (hereafter also referred to the notebook computer as a "system"). The system 10 receives power from an AC power source 2, via an AC/DC adaptor 1, or from a (rechargeable) battery pack 3. The AC/DC adaptor 1, which is a device that converts an AC voltage into a DC voltage so that the system 10 can use the AC power source 2, is generally designed to output a constant voltage of about 20 V. The battery pack 3 comprises, for instance, eight battery cells of about 1.2 V that are connected in series to output a voltage of approximately 7.4 to 15 V in total. When the AC/DC adaptor 1 supports the characteristic of the charging operation for a battery, such as CVCC (constant voltage and constant current) or CVCWCC (constant voltage, constant wattage, and constant current), normally, as is shown in FIG. 4, a power line for the AC power source 2 and a power line for the battery pack 3 are connected in parallel at point P, and the battery pack 3 can therefore be charged by the AC power source 2. Switching circuits SW1 and SW2 are connected in series on the power lines for the AC/DC adaptor 1 and the battery pack 3, respectively. For these switching circuits are employed, for example, P-channel MOS FETs. The switching circuits receive control signals at their gates, and are turned on and off in response to the voltage level, high or low, of the control signal. The SW1 is to be turned on when power is supplied from the AC power supply 2 to the system 10, while both the SW1 and the SW2 are to be turned on when the battery pack 3 is charged by the AC power source 2 (see FIG. 5A). Further, when power is supplied from the battery pack 3 to the system 10, the SW2 is to be turned on, while the SW1 is turned off in order to prevent a current backflow to the AC/DC adaptor 1 which may be caused by a potential difference (see FIG. 5B).

A DC/DC converter (not shown), which converts a given DC voltage into different DC voltage, is connected in series along the power lines between the power supplies 2 and 3 and the system 10, and reduces a voltage at the terminal of the AC power source 2 or of the battery pack 3 to a level that is proper for the operation of the system 10 (3.3 V or 5 V).

A notebook computer that includes the above described power supply routes traditionally employs the following power supply operation.

(1) When both the AC power source 2 and the battery pack 3 are connected to the system 10, the priority for the supply of power to the system 10 is given to AC power source 2, which has indefinite capacity.

(2) Power is supplied from the battery pack 3 to the system 10 only when the AC power source 2 is not connected to the system 10 (that is, when it is not available).

(3) Priority for the allocation of the power supplied by the AC power source 2 is given to the operation of the system 10. Power from the AC power source 2 is used for charging the battery pack 3 only when the rate of the operation of the system 10 is reduced and there is sufficient power remaining.

The supply of power by the AC power source 2 and the charging and the discharging of the battery pack 3 are controlled by the system 10, which monitors the terminal voltage of the battery pack 3 and detects the completion of charging or discharging. To perform such control of power supplies, some computer systems include a dedicated processor (hereafter referred to as a "power source controller") in addition to a main CPU. In addition, an "intelligent battery" has been widely employed, which is a battery pack that includes various sensors, for detecting the terminal voltage and current and the temperature of the battery pack 3, and a controller for processing the output of the sensors (hereafter referred to as a "charge controller"). The charge controller accumulates the current from the battery to determine the battery's remaining capacity. For example, when the charge controller accumulates the discharge current from the battery and determines that the battery's remaining capacity is equal to or lower than a predetermined value (the charging start voltage), the charge controller transmits a message to a power source controller in the system to begin to charge the battery 3. When the charge controller accumulates the charging current to the battery during the charging process and determines that the battery is fully charged, the charge controller transmits a message to the power source controller to halt the charging. In response to the message, the power source controller turns on or off SW1 and SW2. It should be noted that the intelligent battery is disclosed in, for example, Japanese Unexamined Patent Publication No. Hei 5-184098, which was also assigned to the present applicant.

Users who employ electronic apparatuses that are operated by rechargeable batteries demand that the batteries be kept fully charged to cope with an emergency. Therefore, batteries are charged, for example, about once a day, regardless of the actual operational periods and the remaining capacities of the batteries. In other words, in many cases batteries are repetitively subjected to short discharging and charging. If the short discharging and charging are repeated, however, the following problems arise:

(1) The capacity of a battery deteriorates because of the memory effect of the battery.

(2) In the case of using the intelligent battery, an error of a value measured by its charge controller (e.g., remaining capacity of a battery) is accumulated and thus increased.

Recent notebook computers therefore tend to support a "full discharge" function. With this function, when the system 10 is operated by the AC power source 2 (i.e., when the SW1 is on and the SW2 is off), the power source for the system 10 is forcibly switched to the battery pack 3 (i.e., the SW1 is turned off and the SW2 is turned on) to further discharge (fully discharge) the battery pack 3. By such full discharge, the memory effect of the battery can be removed, and, for the intelligent battery, an error for the measured values that were accumulated in the charge controller can be refreshed. By entering a key (for example, an entry performed with a predetermined function key) which instructs full discharge operation, the system 10 is shifted to a full discharge mode. An electronic apparatus that supports a full discharge function is disclosed in, for example, Japanese Unexamined Patent Publication No. Hei 4-205120.

More specifically, a "full discharge mode" is an operation mode where no power is supplied from the AC power source 2 (where the SW1 is off and the SW2 is on) even when it is inserted into the system 10, and is the opposite of the traditional operation for a computer system where the highest priority is given to the supply of power from a constant and steady AC power source. When the AC power source 2 is inserted, therefore, a user may assume that power is supplied constantly and steadily from the AC power source 2 and will attempt to exchange the battery pack 3, while the user forgets (or does not notice) that the system 10 is being operated in the full discharge mode. However, the power lines from the Ac power source 2 and the battery pack 3 are joined at point P, as is shown in FIG. 4, and there is only one route for the supply of power to the system 10. If the battery pack 3 is removed in the full discharge mode, therefore, the supply of power is completely cut off, and the entire system 10 is shut down (see FIG. 5C). When the system 10 is suddenly shut down, data being processed will be lost and the task executed by the CPU 11 cannot be resumed at the same point. The hardware of the system 10 may also be damaged.

SUMMARY OF THE INVENTION

It is an object of the present invention to provide a data processing system that is operated by a battery, and an excellent power supply apparatus for a data processing system and a method for the employment of the apparatus.

It is another object of the present invention to provide an excellent data processing system that is connected to the power lines leading from an external AC power source and an internally mounted battery which are arranged in parallel, so that it is operated by power supplied by one of them, and an excellent power supply apparatus for such a data processing system and a method for the employment of the apparatus.

It is a further object of the present invention to provide a data processing system that employs a rechargeable battery and supports full discharge of the battery, and that is not shut down even if a user mistakenly removes a battery while the system is being operated in a full discharge mode, and a power supply apparatus for such a data processing system and a method for the employment of the apparatus.

To achieve the enumerated objects, according to the first aspect of the present invention, a data processing system, to which power is supplied by a first and a second power source, comprises: a first and a second electric circuitry; a first power line for connecting an output terminal of the first power source to the first electric circuitry; a second power line for connecting the output terminal of the first power source to the second electric circuitry via a first switch (SW-A); a third power line for connecting an output terminal of the second power source to the first electric circuitry via a second switch (SW2); a fourth power line for connecting the output terminal of the second power source to the second electric circuitry via a third switch (SW-B); and switch control means for transmitting a control signal to turn on or off the first, the second, and the third switch.

According to the second aspect of the present invention, a power supply apparatus, for a data processing system that when in operation employs an external power source and a battery and that includes a first and a second electric circuitry, comprises: a first power line for connecting an output terminal of the external power source to the first electric circuitry; a second power line for connecting the output terminal of the external power source to the second electric circuitry via a first switch (SW-A); a third power line for connecting an output terminal of the battery to the first electric circuitry via a second switch (SW2); and a fourth power line for connecting the output terminal of the battery to the second electric circuitry via a third switch (SW-B).

According to the present invention, therefore, when a data processing system is to be operated in a full discharge mode, the external power source constantly and steadily supplies power to the first electric circuitry, while the battery supplies power to the second electric system until the discharging has been completed. The first electric circuitry is designed by components, such as a CPU and a main memory, that force the entire system to be shut down when power supply to those components is suddenly stopped. The second electric circuitry is designed by components, such as a backlight of a liquid crystal display device, that do not cause the entire system to be shut down even when the power supply to those components is suddenly halted. In other words, with the present invention there are two power sources to that supply power to the system during full discharge: an external power source and a battery. When a user mistakenly removes a battery while full discharge of the battery is in progress, only the power supply to the second electric circuitry is stopped, and the whole system will not be shut down. That is, since power is supplied to the system when it is in a full discharge mode by two power sources, an AC power source and a battery, the system will not be shut down even though a user mistakenly removes a battery.

With the system so set that when the removal of a battery is detected a full discharge mode will be exited and the power will be supplied by an external power source, only a backlight will be turned off when the battery is removed. The system can recover immediately employing the power supplied from the external power source, and the task will not be abruptly terminated.

Other objects, features, and advantages of the present invention will be apparent from the detailed explanation of embodiments of the present invention, which will be described later while referring to the accompanying drawings.

BRIEF DESCRIPTION OF THE DRAWINGS

FIG. 2 is a diagram illustrating a power supply system for a notebook computer according to the embodiment of the present invention.

FIG. 3 is a diagram showing the processing of the power supply system for a notebook computer according to the embodiment of the present invention, or more specifically.

FIG. 4 is a diagram illustrating a conventional power supply system for a notebook computer.

FIG. 5 is a diagram showing the processing of the conventional power supply system for a notebook computer, or more specifically.

FIG. 6 shows operations of the individual switches.

DESCRIPTION OF THE ILLUSTRATIVE EMBODIMENTS

A. Hardware Configuration of a Notebook Computer

Figure 1:
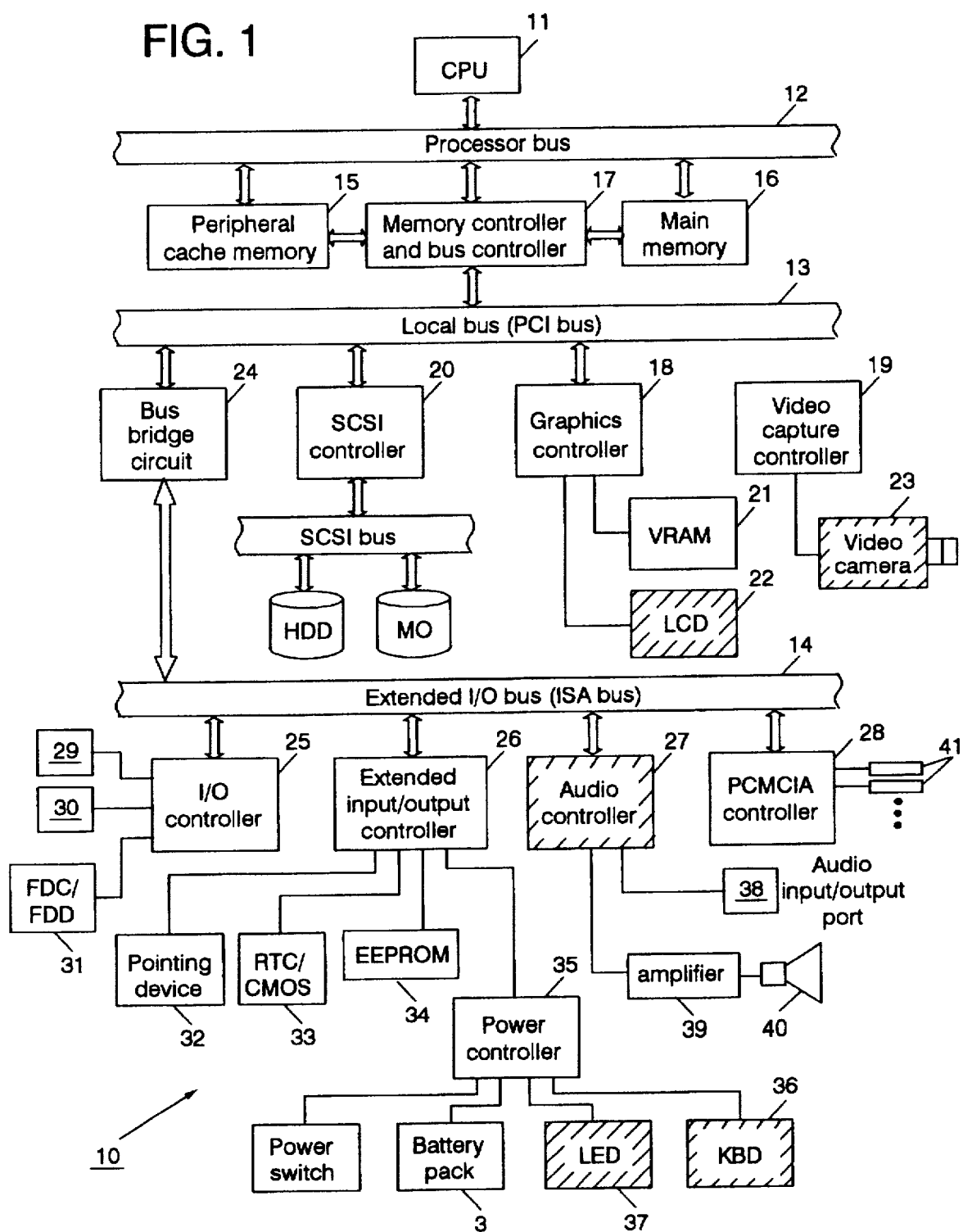
FIG. 1 is a schematic diagram illustrating the hardware arrangement of a notebook computer according to one embodiment of the present invention.

FIG. 1 is a schematic block diagram illustrating an essential hardware configuration of a notebook computer 10 according to one embodiment of the present invention.

The system 10 includes three-layered buses, a processor bus 12, a local bus (PCI bus) 13, and an extended I/O bus (ISA bus) 14, that permit a CPU 11 to communicate with individual input/output devices. The processor bus 12, which is a high speed bus that uses an external signal from the CPU 11, is employed mainly for the connection of an external cache memory 15 and a main memory 16.

The processor bus 12 communicates with the local bus 13 via a bus controller 17. The bus controller 17 in this embodiment is formed of chips that include a memory controller.

A PCI (Peripheral Components Interconnect) bus, whose data transfer rate is relatively high, is employed as the local bus 13, to which are connected input/output devices for which high speed processing is required, such as a graphics controller 18, a video capture controller 19, and an SCSI (Small Computer System Interface) controller 20.

The graphics controller 18 is a peripheral LSI that controls a display device on which are displayed image data according to the contents which are written into a VRAM 21. A VGA (Video Graphic Array), for example, is employed as the graphics controller 18. A liquid crystal display device (LCD) 22, which is an image data display device, is connected, as a standard display device, to the graphics controller 18 in this embodiment.

The video capture controller 19 is a controller LSI that processes an analog image signal, which is received from an external device (a video camera or a video replay device), and superimposes the received video data on the image screens, on the display device 22, that are provided by individual application programs. The video capture controller 19 in this embodiment is connected to a video camera 23 that captures an image.

The SCSI controller 20, an LSI chip for SCSI control, is employed to enable the local bus 13 to communicate with a hard disk drive (HDD), a magneto-optic disc (MO), both of which have the SCSI interface, and various other peripheral storage devices (not shown).

The extended I/O bus 14, which is at the lowest layer, communicates with the local bus 13 via a bus bridge circuit 24. The extended I/O bus 14 is employed to connect input/output devices for which very high speed processing is not required. An ISA (Industrial Standard Architecture) bus, for example, is employed as the extended I/O bus 14. To the extended I/O bus 14 are connected an I/O controller 25, an extended I/O controller 26, an audio controller 27, and a PCMCIA (Personal Computer Memory Card Interface Association) controller 28. The bus bridge circuit 24 in this embodiment is designed as a single chip in which are packaged an interrupt controller and a DMA controller and a timer.

The I/O controller 25 is a peripheral LSI that controls the timing for the transfer of data between the extended I/O bus 14 and various I/O devices (e.g., a modem and a printer), which are connected via serial/parallel ports 29 and 30, and between the extended I/O bus 14 and auxiliary storage devices such as an FDC/FDD 31.

The extended I/O controller 26 is a peripheral LSI by which a pointing device 32, an RTC (Real Time Clock)/CMOS 33, an EEPROM (Electrically Erasable PROM) 34, and a power controller 35 communicate with the extended I/O bus 14. The pointing device 32 is a coordinate input means, such as a mouse or a joy stick. The CMOS 33 is a memory device where data for the system configuration are temporarily stored. In this embodiment, the CMOS 33 and the RTC are packaged in the same chip. The EEPROM 34 is a nonvolatile memory device in which are stored data required for maintaining the secrecy of information for the system 10, such as a password. The power controller 35 monitors the terminal voltage of the battery 3 (the remaining capacity of the battery 3 if it is an intelligent battery) or a matrix entered through a keyboard 36 and controls the supply of power to the system 10. More specifically, the power controller 35 outputs a control signal that is employed to turn on or off the switches SW1, SW2, SW-A, and SW-B, which are located on the power lines that extend from the AC power source 2 and the battery pack 3 to the system 10 (see FIG. 2). The power controller 35 then starts or terminates the discharge of the battery 3, or, upon the request of a user, performs the full discharge of the battery 3 (this process will be described later). In addition, the power controller 35 permits an LED status indicator 37 to display the current power supply status of the system 10 (e.g., in the suspended status, in the charged status, or in a low-battery status).

The audio controller 27 is a peripheral LSI that processes the input/output of audio signals. In this embodiment, the audio controller 27 exchanges audio signals via an audio input/output port 38, or outputs audio signals via an amplifier 39 to a loudspeaker 40, which is equipped as a default in the system 10.

The PCMCIA controller 28 is an interface controller that enables data exchange between a PCMCIA card and the ISA bus 14. One or more slots 41 in which a PCMCIA card or the like is loaded are arranged on the side of the body of the computer 10.

It is well known to one having ordinary skill in the art that there are more hardware components other than those that are shown in FIG. 1 for the computer system 10. In this embodiment, however, to simplify the explanation such other components are not illustrated.

It should be noted here that "the second electric circuitry" (block B in FIG. 2, which will be described later), which is cited in claims 1, 5, 8, and 9, corresponds to the video camera 23, the backlight of the LCD 22, the audio controller 27, the keyboard 36, and the LED status indicator 37 (blocks in which hatching is performed in FIG. 1). It would be easily understood by one having ordinary skill in the art that those hardware components do not affect the operation of the system 10 even when the supply of power to them is abruptly cut off.

B. Power Supply System for a Notebook Computer

FIG. 2 shows a power supply routes for the notebook computer 10 according to the embodiment of the present invention. The same reference numbers are used to denote those components in FIG. 2 that correspond to or are identical with the components in FIG. 4.

The main feature of the power supply routes according to the embodiment of the present invention is that the load for the system 10 is split between two blocks, block A and block B, and the arrangement of the power lines of the AC power source 2 and the battery pack 3.

B-1. Division of a Load on a System

Block B includes at least several hardware components among which are the video camera 23, the backlight of the LCD 22, the audio controller 27, the keyboard 36, and the LED status indicator 37. Block B is the discharge destination to fully discharge the battery 3. As the power consumed by block B is greater, the period which is taken for fully discharging the battery 3 is shortened. Since the backlight of the LCD 22 is one of the hardware components that consume the greatest amount of power in the system 10, it will be easily understood by one having ordinary skill in the art that by including the backlight of the LCD in block B the present invention efficiently functions.

Block A includes all hardware components other than those in block B. Power is constantly and steadily supplied to block A from the AC power source 2 even during the full discharge of the battery 3. Hardware for which there must be no abrupt cessation of power (for example, the CPU 11 and the main memory 16) should be included in block A.

B-2. Arrangement of Power Lines

The output terminal of the AC power source 2 is connected to the AC/DC adaptor 1, and the power line runs through the SW1 toward the load of the system 10 and branches toward block A and block B at branch point Q. The SW-A is further connected in series along the power line for block B. Since the SW1 is constantly in the ON state either when the whole system 10 is to be operated by the AC power source 2 or when the battery 3 is to be fully discharged, it is presumed for the following explanation that the SW1 is short-circuited.

The output terminal of the battery 3 is connected via the SW2 in parallel to the power line for the AC power source 2 at point P, and then the power line runs toward block A. One of the output terminals of the battery 3 branches at point R and runs to block B via the switch SW-B.

The switches SW1, SW2, SW-A, and SW-B in this embodiment are formed from a P-channel MOS FET. A control signal that is output by the power controller 35 is received at the gates of the switches (as is previously described). A control signal, Discharge#, which indicates that full discharge of the battery 3 is instructed, is received at the gate of the SW-B, while an inverted Discharge# signal is received at the gate of the SW-A.

When power from the AC power source 2 is supplied to the system 10, the power controller 35 causes the Discharge# to go high, and turns on the SW-A, turns off the SW-B, and also turns on the SW2 (when the battery 3 is being charged simultaneously). Accordingly, power is supplied from the AC power source 2 to both block A and block B (see FIG. 3A).

To effect the full discharge of the battery 3, the power controller 35 causes the Discharge# to go active_low, and turns off the SW-A, turns on the SW-B, and also turns off the SW2. Accordingly, block A receives power from the AC power source 2, while block B receives power from the battery 3 (see FIG. 3B).

The operations of the individual switches are shown in FIG. 6.

It would be easily understood by one having ordinary skill in the art that the above described arrangement of power lines can be included in the DC/DC converter (not shown) of the system 10.

A voltage detector (not shown) is connected in parallel at the output terminal of the battery 3. The voltage detector, which consists of an OP amplifier, fetches the terminal voltage of the battery 3 and transmits it to the power controller 35. According to the received voltage level, the power controller 35 can both determine that the battery 3 has been removed from the system 10 and that the full discharge of the battery 3 has been terminated.

C. Operation of a Power Supply System

An explanation has been given in articles A and B for the hardware structure of the system 10 according to the embodiment of the present invention. In this article, the operation of the power supply system for the system 10 and the processing for the present invention will be described while referring to FIG. 3.

Figure 3A:
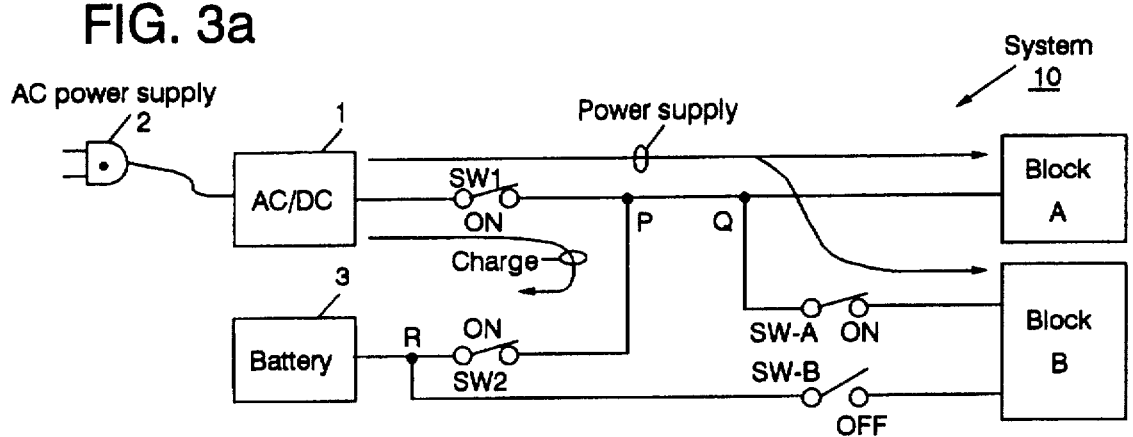
FIG. 3A is a diagram showing the normal operation by an AC power source 2.

Suppose that only the AC power source 2 supplies power to the system 10. In this case, as is shown in FIG. 3A, the SW-A and the SW2 are on and the SW-B is off.

Figure 3B:
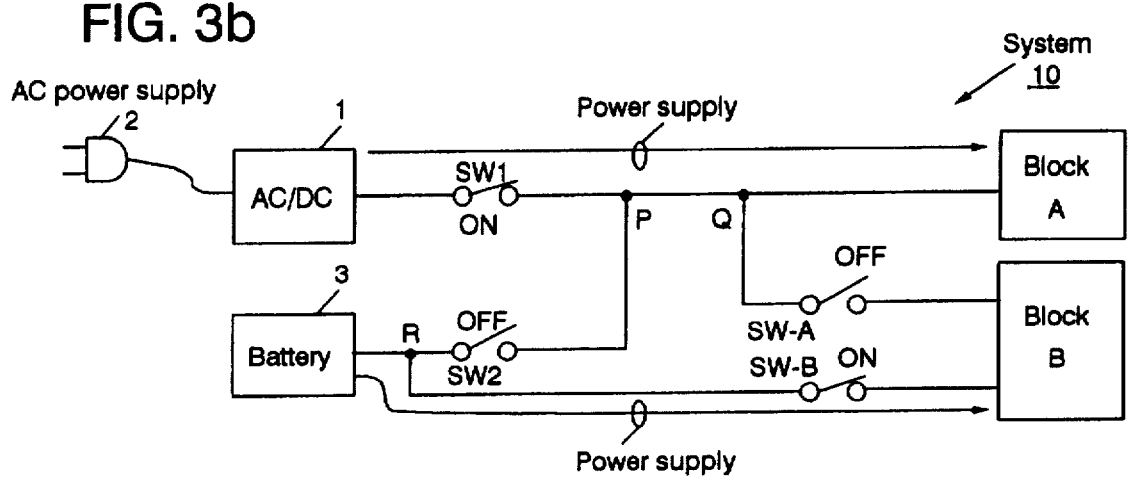
FIG. 3B is a diagram showing the operation while the full discharge of a battery 3 is in progress.

When the power controller 35 detects a key entry by a user (e.g., the depression of a specific function key), the system 10 enters the full discharge mode, and the power controller 35 causes control signal Discharge# to go active_low level. Accordingly, the SW-A and the SW2 are turned off and the SW-B is turned on, and block A receives power from the AC power source 2 while block B receives power from the battery 3, as is shown in FIG. 3B.

Figure 3C:
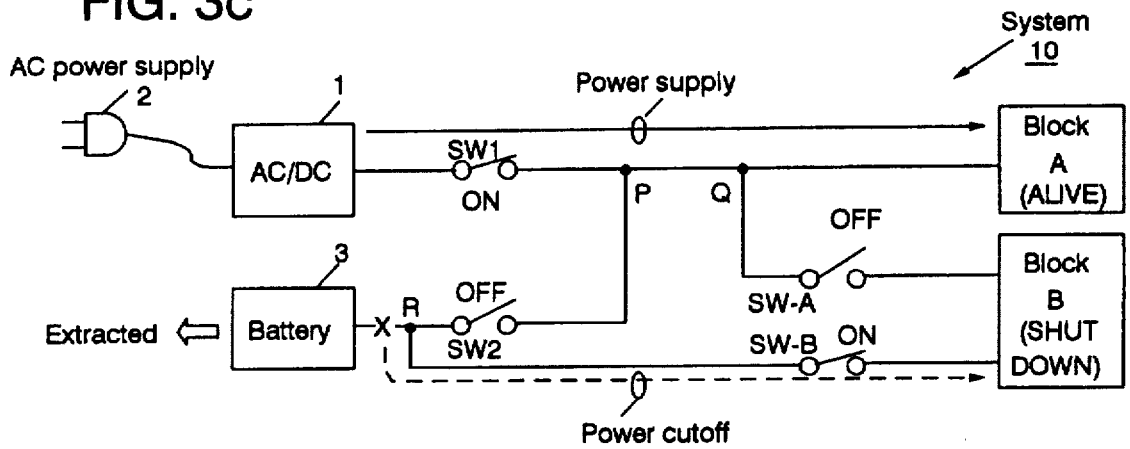
FIG. 3C is a diagram showing the operation when the battery 3 is suddenly removed while the full discharge of the battery 3 is in progress.
Figure 5A:
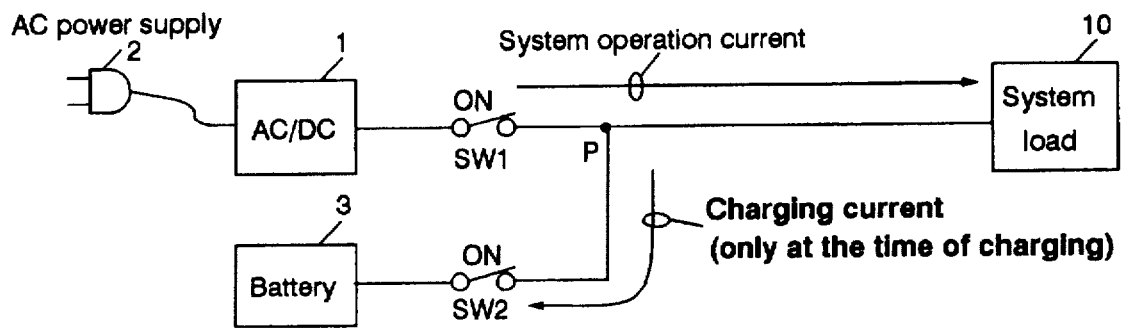
FIG. 5A is a diagram showing the normal operation by an AC power source 2.
Figure 5B:
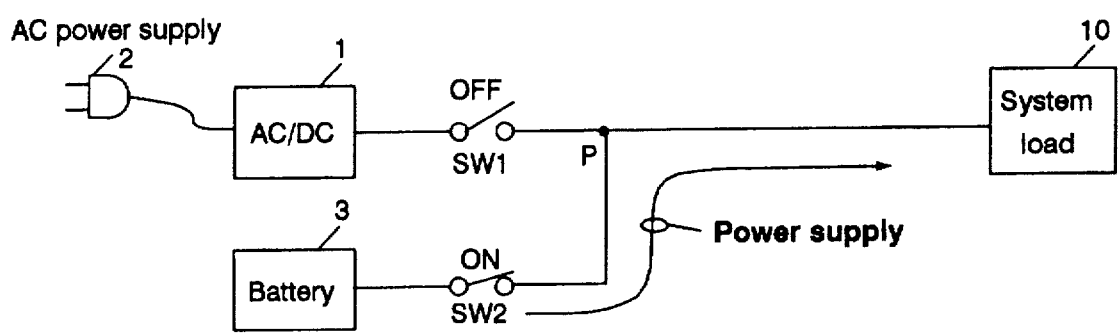
FIG. 5B is a diagram showing the operation while the full discharge of a battery 3 is in progress.
Figure 5C:
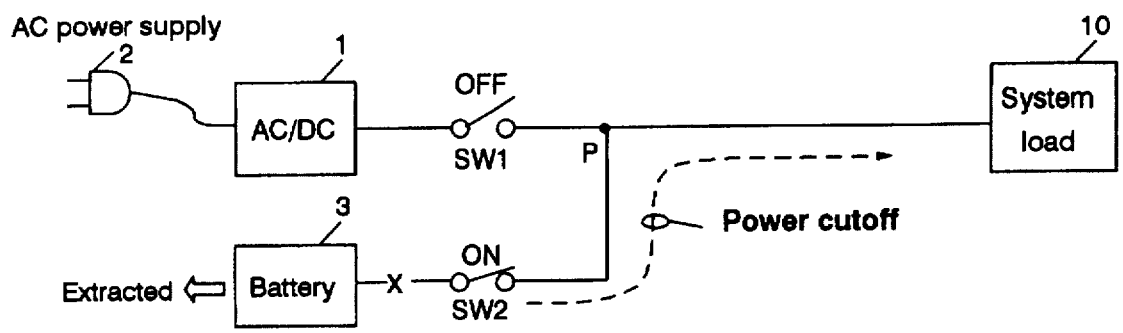
FIG. 5C is a diagram showing the operation when the battery 3 is suddenly removed while the full discharge of the battery 3 is in progress.

It may so happen that a user may mistakenly remove the battery 3 for replacement while the full discharge of the battery 3 is in progress, because there is no difference in the appearance of the system 10 compared with when it is powered by the AC power source 2, and it is difficult for the user to distinguish at a glance whether a full discharge of the battery 3 is being performed. By removing the battery 3, the power supply from the battery 3 to block B is thus cut off and, for example, the backlight of the LCD 22 is turned off. As block B comprises hardware components that have little affect on the operation of the system 10, and as other hardware components (a CPU and a main memory), which are more vital to the operation of the system 10, receive power constantly from the AC power source 2, the whole system 10 is not shut down even though the supply of power from the battery 3 is abruptly terminated, as is shown in FIG. 3C.

Immediately after the power controller 35 detects the removal of the battery 3, the power controller 35 resets the Discharge#. In response to this, the SW-A and the SW2 are turned on and the SW-B is turned off, and the operating status recovers to that which existed when only the AC power source 2 supplied power to the system 10, as is shown in FIG. 3A. The backlight of the LCD 22, which has been off, is almost simultaneously turned on, and the operating status of the system 10 recovers to that which existed immediately before the battery 3 was removed.

When the full discharge of the battery 3 is terminated, the processing is performed in the same manner as when the battery 3 is removed. More specifically, the power controller 35 detects that the terminal voltage of the battery 3 has fallen and is lower than a predetermined value (discharge halt voltage), the power controller 35 resets the Discharge#, and the operating status recovers to that which existed when only the AC power source 2 supplied power to the system 10. At this time, the battery 3 is not excessively discharged. In addition, the system 10 is not shut down.

The present invention has been explained in detail while referring to a specific embodiment. It is, however, obvious to one having ordinary skill in the art that it is possible to vary or to modify the embodiment of the present invention without exceeding the scope of the present invention. In other words, the present invention is disclosed as the preferred embodiment, and should not be limited to the above described embodiment. To understand the subject of the present invention, the claims of the present invention should be referred to.

As described above in detail, in a data processing system that employs a power supply apparatus for the data processing system and a method for using the apparatus according to the present invention, since two power supplying means, an AC power source and a battery, are designated to the respective circuitries, the system will not be shut down even if a user mistakenly removes the battery. Further, when the power supply arrangement is so designed that only an external AC power source supplies power to the system, in response to the detection of the removal of a battery, only the backlight of an LCD, or the like, is turned off at the moment the battery is removed, and is immediately turned on, so that a task will not be abruptly terminated.

We claim:

1. A data processing system, to which power is supplied by a first and a second power source, comprising:

a first and a second electric circuitry;

a first power line for connecting an output terminal of said first power source to said first electric circuitry;

a second power line for connecting said output terminal of said first power source to said second electric circuitry via a first switch;

a third power line for connecting an output terminal of said second power source to said first electric circuitry via a second switch;

a fourth power line for connecting said output terminal of said second power source to said second electric circuitry via a third switch; and a switch control means for transmitting a control signal to turn on or turn off said first, second, and third switch.

2. A data processing system according to claim 1, wherein said first power source is an external AC power source, and said second power source is an internally mounted battery pack.

3. A data processing system according to claim 1, wherein said second electric circuit includes hardware components that do not shut down the operation of said data processing system even when the power supply to them is abruptly halted.

4. A data processing system according to claim 1, wherein said second electric circuitry includes a backlight of a liquid crystal display device.

5. A data processing system according to claim 1, further comprising detecting means for detecting the removal of said second power source, wherein said switch control means turns on said first switch in response to the detection result of said detecting means.

6. A power supply apparatus, for a data processing system that is capable of being operated by an external power source and a battery and that includes a first and a second electric circuitry, comprising:

a first power line for connecting an output terminal of said external power source to said first electric circuit;

a second power line for connecting said output terminal of said external power source to said second electric circuit via a first switch;

a third power line for connecting an output terminal of said battery to said first electric circuit via a second switch; and a fourth power line for connecting said output terminal of said battery to said second electric circuit via a third switch.

7. A power supply apparatus for a data processing system according to claim 6, wherein said second electric circuit includes hardware components that do not shut down the operation of said data processing system even when the power supply to them is abruptly halted.

8. A data processing system according to claim 6, wherein said second electric circuitry includes a backlight of a liquid crystal display device.

* * * * *